United States Patent
Sehr et al.

(10) Patent No.: US 9,756,149 B2
(45) Date of Patent: *Sep. 5, 2017

(54) MACHINE-SPECIFIC INSTRUCTION SET TRANSLATION

(71) Applicant: Google Inc., Mountain View, CA (US)

(72) Inventors: David C. Sehr, Cupertino, CA (US); J. Bradley Chen, Los Gatos, CA (US); Bennet S. Yee, Mountain View, CA (US); Robert Muth, New York, NY (US); Jan Voung, Oakland, CA (US); Derek L. Schuff, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/082,162

(22) Filed: Mar. 28, 2016

(65) Prior Publication Data

US 2016/0212243 A1 Jul. 21, 2016

Related U.S. Application Data

(63) Continuation of application No. 13/751,729, filed on Jan. 28, 2013, now Pat. No. 9,300,760.

(51) Int. Cl.
*H04L 29/06* (2006.01)
*H04L 29/08* (2006.01)
*H04L 12/24* (2006.01)

(52) U.S. Cl.
CPC .............. *H04L 67/42* (2013.01); *H04L 67/06* (2013.01); *H04L 41/08* (2013.01)

(58) Field of Classification Search
CPC ..... H04L 12/4641; H04L 12/66; H04L 29/06; H04L 67/42; H04L 12/6418; H04L 69/08;

(Continued)

(56) References Cited

U.S. PATENT DOCUMENTS 7,058,932 B1 * 6/2006 Jennings ............. G06F 9/45504
717/138
2002/0198931 A1 * 12/2002 Murren et al. ................ 709/203
(Continued)

OTHER PUBLICATIONS

Ansel, J., et al., "Language-Independent Sandboxing of Just-in-Time Compilation and Self-Modifying Code", PLDI 2011, San Jose, CA, USA, Jun. 4-8, 2011, 12 pages.

(Continued)

*Primary Examiner* — Hee Soo Kim
*Assistant Examiner* — Elizabeth Kassa
(74) *Attorney, Agent, or Firm* — Fish & Richardson P.C.

(57) ABSTRACT

Methods, systems, and computer program products are provided for machine-specific instruction set translation. One example method includes identifying computing devices, each device having a respective software component installed, the software component including a translator component for translating a program in a portable format to a machine-specific instruction set, and a sandbox component for executing programs translated to the machine-specific instruction set on the computing device using software-based fault isolation; identifying computing devices having a given hardware configuration; and transmitting another translator component and another sandbox component to each of the identified computing devices. Each of the identified computing devices having the given hardware configuration is configured to receive the components and to configure its software component to use the received components in lieu of the corresponding components.

19 Claims, 6 Drawing Sheets

(58) Field of Classification Search
CPC ... H04L 69/329; H04L 12/1827; H04L 67/34; H04L 67/36
USPC .......................................................... 709/203
See application file for complete search history.

(56) References Cited

U.S. PATENT DOCUMENTS

| | | | |
|---|---|---|---|
| 2004/0119715 A1 | 6/2004 | Everett et al. | |
| 2004/0194076 A1* | 9/2004 | Comp et al. | 717/158 |
| 2007/0291910 A1 | 12/2007 | Bucchieri et al. | |
| 2008/0010629 A1* | 1/2008 | Berg et al. | 717/116 |
| 2010/0293591 A1* | 11/2010 | Shah | 726/1 |
| 2011/0137933 A1* | 6/2011 | Pelenur et al. | 707/769 |
| 2011/0145926 A1* | 6/2011 | Dalcher et al. | 726/26 |
| 2011/0289546 A1* | 11/2011 | Pieczul et al. | 726/1 |
| 2011/0307955 A1* | 12/2011 | Kaplan et al. | 726/23 |
| 2012/0005571 A1* | 1/2012 | Tang et al. | 715/234 |
| 2012/0297492 A1* | 11/2012 | Court | G06F 9/468 726/29 |
| 2013/0031459 A1* | 1/2013 | Khorashadi et al. | 715/234 |
| 2013/0060905 A1* | 3/2013 | Mickens et al. | 709/219 |
| 2013/0145463 A1* | 6/2013 | Ghosh et al. | 726/22 |
| 2013/0167243 A1* | 6/2013 | Corbett | G06F 21/53 726/26 |
| 2013/0297793 A1* | 11/2013 | Lord et al. | 709/225 |
| 2014/0173592 A1 | 6/2014 | y Arcas et al. | |

OTHER PUBLICATIONS

Chernoff, A., et al., "FX!32: A Profile-Directed Binary Translator", IEEE Micro, Mar./Apr. 1998, vol. 18, No. 2, pp. 56-64.

"Rosetta". apple.wikia.com [online] [retrieved on Jan. 28, 2013]. Retrieved from the Internet: <URL: http://apple.wikia.com/wiki/Rosetta>, 1 pg.

Schneider, F., "CS 513 System Security—Software-based Fault Isolation". cs.cornell.edu [online]. 2012 [retrieved on Aug. 30, 2012]. Retrieved from the Internet: <URL: http://www.cs.cornell.edu/courses/cs513/2005fa/L13.html>, 5 pages.

"Technical Overview—Native Client—Google Developers". developers.google.com [online]. 2012 [retrieved on Aug. 30, 2012]. Retrieved from the Internet: <URL:https://developers.google.com/native-client/overview>, 7 pages.

Yee, B., et al., "Native Client: A Sandbox for Portable, Untrusted x86 Native Code", Proceeding of the 2009 30th IEEE Symposium on Security and Privacy conference, Oakland, CA, USA, May 17-20, 2009, 15 pages.

* cited by examiner

MACHINE-SPECIFIC INSTRUCTION SET TRANSLATION

BACKGROUND

This specification relates to instruction set translation, and more specifically to adapting instruction set translation for particular host machines.

Some web browsers include extension mechanisms to allow native code to be loaded and run as part of a web application. Native code can be translated to execute within language-independent sandboxes, which can confine the code behavior by restricting instructions that may be executed, the sequence of instructions, and memory addresses used by the instructions.

SUMMARY

In general, one aspect of the subject matter described in this specification may be embodied in methods that include the actions of identifying a first plurality of client devices, each first client device having a respective web browser installed, the web browser comprising a plurality of components including a web page renderer component for rendering web pages, a first translator component for translating a program in a portable format to a machine-specific instruction set, and a first sandbox component for executing programs translated to the machine-specific instruction set on the first client device using software-based fault isolation; identifying one or more second client devices of the first plurality of client devices, wherein each of the second client devices has a given hardware configuration; and transmitting a second translator component and a second sandbox component to each of the second client devices, wherein each of the second client devices is configured to receive the second components and configure the respective web browser of the second client device to use the second components in lieu of the corresponding first components. Other embodiments of this aspect include corresponding systems, apparatus, and computer programs.

These and other aspects can optionally include one or more of the following features. The hardware configuration can specify one or more microprocessors. The hardware configuration can specify a model type of the client device. Each sandbox component can include a validator component for ensuring that a program in the machine-specific instruction set does not contain any unsafe instructions, does not load or store data outside of the sandbox, and has control flow integrity. The sandbox can include a run-time library that provides one or more interfaces, each interface including an invocation mechanism to facilitate access to resources outside the sandbox by a program executing in the sandbox.

In general, another aspect of the subject matter described in this specification may be embodied in methods that include the actions of receiving a second translator component and a corresponding second sandbox component for use in a web browser on a client device, the web browser comprising a plurality of components including a web page renderer component for rendering web pages, a first translator component for translating a program in a portable format to a machine-specific instruction set, and a corresponding first sandbox component for executing programs translated to the machine-specific instruction set on the first client device using software-based fault isolation; and configuring the web browser to use the second translator component instead of the first translator component, and to use the second sandbox component instead of the first sandbox component. Other embodiments of this aspect include corresponding systems, apparatus, and computer programs.

These and other aspects can optionally include one or more of the following features. Each sandbox component can include a validator component for ensuring that a program in the machine-specific instruction set does not contain any unsafe instructions, does not load or store data outside of the sandbox, and has control flow integrity. The actions can further comprise receiving a program in portable format, and the web browser can perform: translating the program using the second translator component to create a machine-specific program; and executing the machine-specific program on the client device using the second sandbox component. The actions can further comprise receiving a program in portable format, and the web browser can perform: selecting one of the first or second translator components based on a hardware configuration of the client device; translating the program using the selected translator component to create a machine-specific program; and executing the machine-specific program on the client device using the sandbox component that corresponds to the selected translator component.

In general, another aspect of the subject matter described in this specification may be embodied in methods that include the actions of identifying a first plurality of computing devices, each first computing device having a software component comprising a first translator component for translating a program in a portable format to a machine-specific instruction set, and a first sandbox component for executing programs translated to the machine-specific instruction set on the first computing device using software-based fault isolation; identifying one or more second computing devices of the first plurality of computing devices, wherein each of the second computing devices has a given hardware configuration; and transmitting a second translator component and a second sandbox component to each of the second computing devices, wherein each of the second computing devices is configured to receive the second components and configure the software component of the second computing device to use the second components in lieu of the corresponding first components. Other embodiments of this aspect include corresponding systems, apparatus, and computer programs.

These and other aspects can optionally include one or more of the following features. The software component can be a library accessible to computing devices through an application programming interface. The hardware configuration can specify one or more microprocessors. The hardware configuration can specify a model type of the computing device. Each sandbox component can include a validator component for ensuring that a program in the machine-specific instruction set does not contain any unsafe instructions, does not load or store data outside of the sandbox, and has control flow integrity. The sandbox can include a run-time library that provides one or more interfaces, each interface including an invocation mechanism to facilitate access to resources outside the sandbox by a program executing in the sandbox.

Particular embodiments of the subject matter described in this specification may be implemented to realize one or more of the following advantages. A Software-Based Fault Isolation (SFI) sandbox may be matched to a host system. Security and performance benefits may be realized by adapting an SFI-based sandbox to a client device's hardware configuration. A developer of program code to be executed by a web browser may create a single portable program, rather than maintain a different program for each possible application execution environment and host device hardware configuration. An appropriate application environment may be selected by a web browser for validating, translating, and executing program code, based on selection criteria such as a user's preferences, an application's requirements and/or type, a trust relationship with an application provider, and other suitable criteria. Updated application environment components may be deployed to leverage new hardware and/or operating system features without disrupting developers or web server administrators. Sandboxes and validators may maintain the overall security of a client device in case of a faulty hardware component or translator. Performance improvements to code generation may be implemented, by providing a new translator and a new validator, but without needing assistance from developers or users. Support can be provided for hardware and for operating systems that were unknown at the time an application and/or browser were originally released.

The details of one or more embodiments of the subject matter described in this specification are set forth in the accompanying drawings and the description below. Other potential features, aspects, and advantages of the subject matter will become apparent from the description, the drawings, and the claims.

BRIEF DESCRIPTION OF DRAWINGS

Like reference symbols in the various drawings indicate like elements.

DETAILED DESCRIPTION

Figure 1:
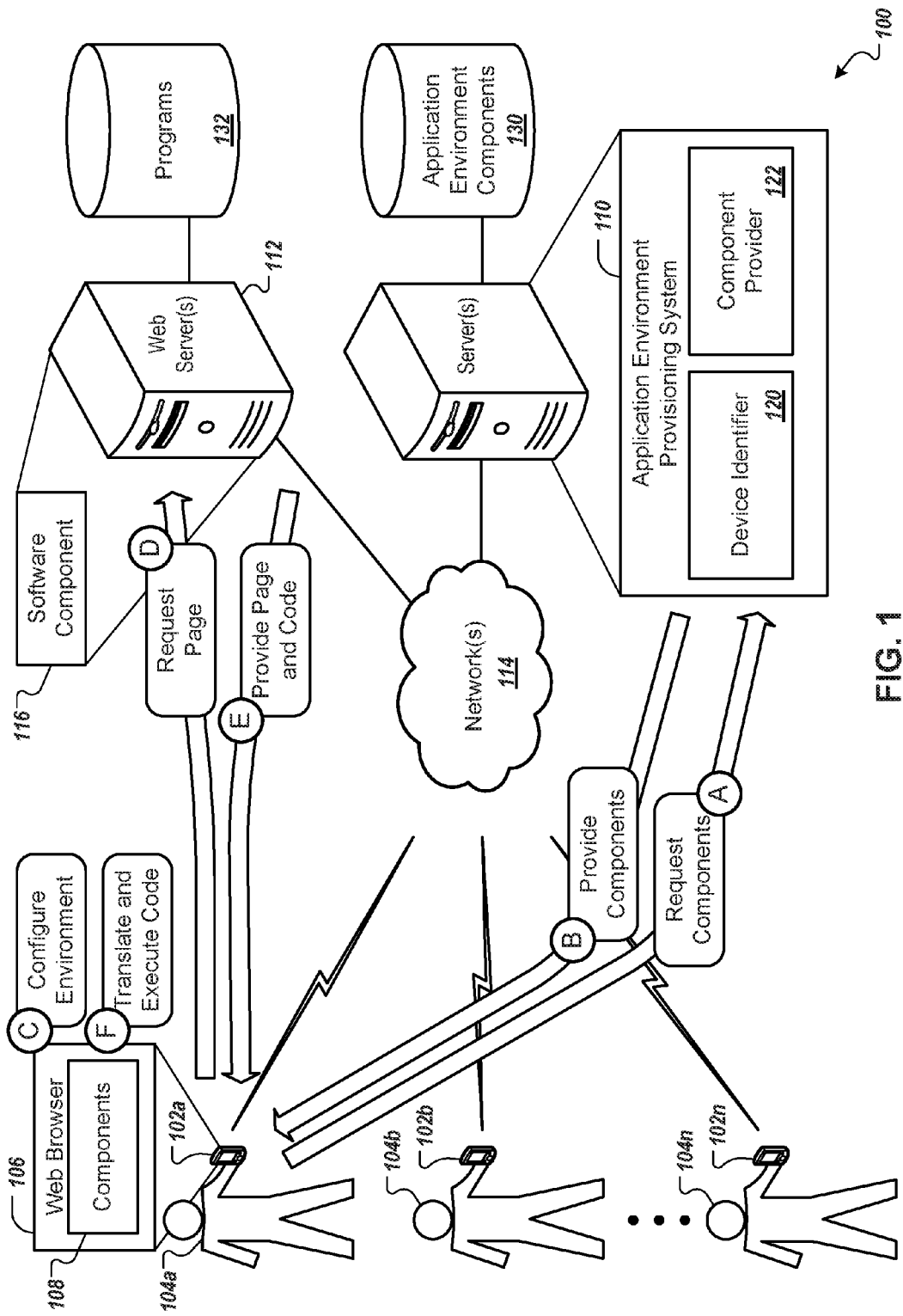
FIG. 1 is a schematic illustration of an example system that provides application environments to computing devices.

FIG. 1 is a schematic illustration of an example system 100 that provides security-enhanced application environments (e.g., web browser environments, application engine environments, etc.) to computing devices. In general, an application environment can run applications by providing a set of Application Programming Interfaces (APIs) and/or system calls that applications may use. Moreover, an application environment can implement sandboxing techniques to prevent an application from executing potentially insecure instructions, such as system calls that may be used to directly access a native operating system. For example, operating system-based sandboxing may be used to run untrusted code as a user-space program, or within a separate virtual machine (VM). As another example, Software-Based Fault Isolation (SFI) can be used by a sandbox to restrict instructions that may be executed, the sequence of instructions, and memory addresses used by the instructions. Software-Based Fault Isolation can allow machine code to be independently verified through static analysis, for example, irrespective of how the code was created.

However, a SFI-based sandbox implementation may generally be constrained by the variety hardware devices (e.g., microprocessors) it supports, and by the variety of applications to be executed within the application environment. By adapting a sandbox to a client device's hardware configuration, for example, security and performance benefits may be realized. The system 100, for example, includes mechanisms for selecting an application environment that is suited for the particular hardware and/or software of a host computing system. Further, the system 100 includes late translation mechanisms for introducing a level of indirection between deployed applications and an application binary interface defined by a sandbox. By combining application environment selection components and translation components, for example, a SFI-based sandbox may be matched to a host system.

In further detail, the system 100 includes various client devices (102a, 102b, 102n, etc.), each operated by a respective user (104a, 104b, 104n, etc.). Each of the client devices 102a, 102b, 102n, for example, can be any of a variety of portable or stationary electronic computing devices, such as smartphones, tablets, readers, media players, laptop computers, and/or desktop computers. The client device 102a, for example, is depicted as running a web browser 106, which can include one or more components 108 (e.g., translators, sandboxes, validators) associated with one or more application environments for executing program code received by the web browser. A translator, for example, can include software for transforming program code of a neutral, portable format (e.g., LLVM bitcode), to an instruction-specific format (e.g., 32-bit x86 machine code, ARM code, etc.). A sandbox, for example, can include a set of software fault isolation rules for a particular hardware configuration. Possible sandboxes, for example, may include variants such as a zero-based x86-32 sandbox, a 4 GB x86-32 sandbox, a zero-based x86-64 sandbox, an x86-64 sandbox with extended address space range (>4 GB), an ARM sandbox, and other sandbox variants (e.g., including non-SFI variants, such as OS sandboxing) which may include security and/or performance enhancements. A validator, for example, can evaluate an application binary to determine whether a sandbox's set of rules are followed, and/or whether the application may be reliably translated by a translator.

Each of the client devices 102a, 102b, 102n, for example, can communicate with an application environment provisioning system 110 and one or more web servers 112 (and with each other) through one or more networks 114. The network(s) 114, for example, may include one or more wired (e.g., Ethernet) or wireless (e.g., Wi-Fi, 3G, 4G, etc.) networks, and may include networks such as a local area network (LAN), a wide area network (WAN), the Internet, or a combination thereof.

The application environment provisioning system 110 can include one or more computing servers configured to execute application code associated with a variety of software components (e.g., modules, objects, libraries, services, etc.), including a device identifier 120 and a component provider 122, for example. The device identifier 120, for example, can identify client devices configured to receive application environment components. For example, each of the client devices 102a, 102b, and 102n can include a web browser (e.g., web browser 106) associated with the application environment provisioning system 110. The respective device users 104a, 104b, and 104n, for example, may have registered with the application environment provisioning system 110 for receiving application environment components to be used by their respective web browsers. In other implementations, for example, application environments may be used in other sorts of applications, such as server systems, virtual machines, etc. The component provider 122, for example, can provide application environment components (e.g., translators, sandboxes, validators) maintained by an application environment components data store 130 to any of the client devices 102a, 102b, and 102n, using an appropriate communications protocol (e.g., Hypertext Transfer Protocol (HTTP), File Transfer Protocol (FTP), etc.).

The web server(s) 112 may be associated with a variety of content providers, such as web page publishers, media providers, and web application providers, for example. In general, upon receiving a request for content from a client device, a web server can identify a requesting application (e.g., a web browser), and can provide content (e.g., web pages, media content, programs, etc.) formatted to be presented by and/or to be executed by the requesting application. For example, upon receiving a request for a web page from the client device 102a, the web server(s) 112 can identify the web browser 106 as being associated with the application environment provisioning system 110. If the requested web page is associated with a program (e.g., a media player, a game, an editor, etc.) that can be executed by the web browser 106, for example, the web server(s) 112 can access a programs data store 132 and can provide program code with the requested web page.

The web server(s) 112 can include a software component 116 which can in turn include one or more subcomponents (e.g., translators, sandboxes, validators) associated with one or more application environments (e.g., runtime environments) for executing program code. The software component 116, for example, can be a library accessible to the web server(s) 112 through an application programming interface. Software developers can provide program code (e.g., a web application) to the web server(s) 112 for storage by the programs data store 132, for example, and for execution during sessions with any of the client devices 102a, 102b, or 102n. For example, the client device 102a can request a web service provided by the web server(s) 112, and the web server(s) can execute the corresponding program code using the software component 116. Communication between the client device 102a and a web application executed by the web server(s) 112, for example, may include HTTP (or HTTPs) requests on standard ports, or other suitable protocols.

In addition to depicting a conceptual diagram of the example system 100 for providing application execution environments to client devices, FIG. 1 also illustrates an example flow of data within the system 100 during steps (A) to (F). The steps (A) to (F) may occur in the illustrated sequence, or they may occur in a sequence that is different than in the illustrated sequence. For example, the steps (A) to (F) may be performed by the system 100 in a variety of orders, and/or one or more steps may be performed concurrently.

As indicated by step (A), a device can request application environment components. For example, the client device 102a can communicate with the application environment provisioning system 110 through the network(s) 114 to request one or more components 108 of an application environment that are designed to operate in conjunction with its web browser 106 and its particular hardware configuration/operating system. Further, the client device 102a may periodically (e.g., hourly, daily, weekly, etc.) communicate with the application environment provisioning system 110, for example, to receive updates that may be available for one or more application environment components 108 associated with its web browser 106. As another example, the application environment provisioning system 110 may send a message to the client device's web browser 106 as component updates become available and/or as a web browser updates become available. To determine whether components are available for a particular client device, for example, the device identifier 120 can receive hardware configuration information (e.g., client device model, type of microprocessor, type and/or amount of memory, type and/or speed of network connection, and other relevant information) from the client device. For example, some microprocessor implementations may include model-specific instructions that are available only in specific implementations of a microprocessor. The device identifier 120, for example, can access the application environment components data store 130 to identify components designed to validate, translate, and/or execute application program code for devices of the identified configuration.

During step (B), application environment components can be provided to the device. For example, the application environment provisioning system 110 can use the component provider 122 to package a sandbox component with its associated validator and translator, and to prepare the components for download by the client device 102a. As another example, a single component may be downloaded by the client device 102a. Various communications protocols may be used for downloading application environment components, such as HTTP, FTP, and other suitable protocols.

During step (C), the device's web browser may be configured to use the provided application environment components. For example, upon downloading one or more components 108, the client device 102a can verify that the components were downloaded successfully, and register the components with the web browser 106. In some implementations, previously existing components may be replaced with updated components. For example, the client device 102a may remove any previously existing components, and replace the components with the updated versions. In some implementations, multiple component sets may be maintained concurrently. For example, the client device 102a may maintain one or more previously existing components along with any newly registered components. Each set of components, for example, may offer particular features or advantages relative to other sets. One set of components, for example, may be more secure than the others, another may offer faster performance, another may offer faster translation time, and so forth. When running application program code, for example, the web browser 106 may select an appropriate set of components for validating, translating, and executing the code, based on selection criteria such as a user's preferences, an application's requirements and/or type, a trust relationship with an application provider, and other suitable criteria.

During step (D), the device can request a web page. For example, the user 104a of the client device 102a can direct the web browser 106 to a web page provided by the web server(s) 112. Upon receiving the request, for example, the web server(s) 112 can identify the web browser 106 running on the client device 102a as a web browser which may include components provided by the application environment provisioning system 110.

During step (E), a web server can provide the web page and associated program code to the device. For example, the web page requested by the web browser 106 of the client device 102a may be associated with a web application or program (e.g., a media player, a game, an editor, etc.) that can execute within the web browser. The web server(s) 112 can retrieve program code from the programs data store 132, for example, and can provide the requested web page and associated code to the client device 102a.

During step (F), the device can translate and execute received code using one or more components of its application environment. For example, the client device 102a can use the web browser 106 to render the received web page (e.g., by parsing Hypertext Markup Language (HTML) and including associated resources), and can use the components 108 to validate the received program code, to translate the code, and to execute the code using an appropriate sandbox. The received program code, for example, may be instruction-set neutral, such as LLVM bit code or another suitable format. During translation, the instruction-set neutral program code may be transformed to machine code that follows sandboxing rules that are specific to a particular instruction set (e.g., an instruction set associated with the hardware configuration of the client device 102a).

Since code program code may be translated on a client device, a developer of the program code provided a web server may generally create a single portable program, instead of maintaining a different program for each possible application execution environment and hardware configuration. Moreover, updated components may be deployed by the application environment provisioning system 110 to leverage new hardware and/or operating system features without requiring cooperation from developers or web server administrators.

Figure 2:
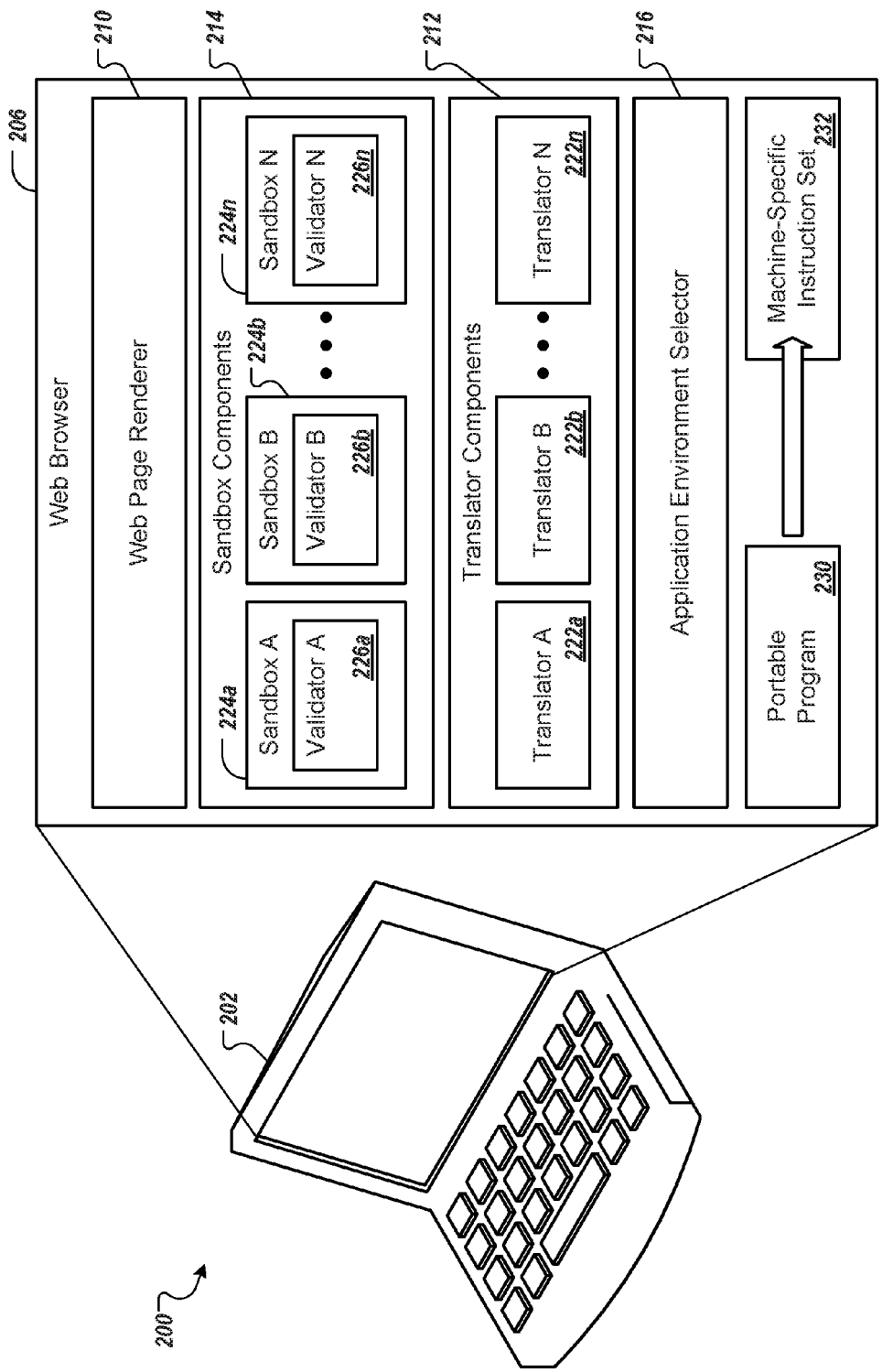
FIG. 2 is a schematic illustration of an example application environment included on a computing device.

FIG. 2 is a schematic illustration of an example application environment 200 included on a computing device. Similar to any of the client devices 102a, 102b, and 102n (shown in FIG. 1), for example, a client device 202 can be any of a variety of portable or stationary electronic computing devices, such as smartphones, tablets, readers, media players, laptop computers, desktop computers, or other suitable devices. Also similar to any of the client devices 102a, 102b, and 102n, for example, the client device 202 can run a web browser 206, which may include components provided by the application environment provisioning system 110.

The web browser 206 in the present example can include a web page renderer 210, one or more translator components 212, one or more sandbox components 214 (each with a corresponding validator component), and an application environment selector 216. The web page renderer 210, the application environment selector 216, and each of the components 212 and 214, for example, may include software components (e.g., modules, objects, libraries, services, etc.) configured to execute on one or more processors associated with the client device 202.

The web page renderer 210, for example, can render web pages received by the web browser 206. A web page, for example, may include HTML script and style sheets which may be parsed by the web page renderer 210, and may include links to web resources (e.g., images, scripts, program code, etc.) referenced by the page. When rendering the web page, for example, the web page renderer 210 can combine the various resources included in the page, for presentation to a user as a cohesive unit.

The translator components 212 may include one or more translators for translating a program in a portable format (i.e., an untranslated format) to a machine-specific instruction set. In the present example, the translator components 212 include a translator 222a (Translator A), 222b (Translator B), and 222n (Translator N). Each of the translators 222a, 222b, and 222n, for example, can include software for transforming program code of a neutral, portable format to an instruction-specific format for execution on the client device 202, based on the device's hardware configuration (e.g., client device type, microprocessor type, microprocessor implementation as specified by CPU family, model and stepping, type and/or amount of memory, type and/or speed of network connection, etc.) and operating system. In general, each of the translators (e.g., translators 222a, 222b, and 222n) may be associated with a different sandbox and validator, however, in some implementations, a single translator may transform program code for multiple sandboxes. Moreover, in some implementations, a translator may be associated with a non-SFI sandbox (e.g., a no alignment null-sandbox for a host with robust OS-based security sandboxing).

The sandbox components 214 may include one more sandboxes for executing programs translated to a machine-specific instruction set using software-based fault isolation. In the present example, the sandbox components 214 include a sandbox 224a (Sandbox A), 224b (Sandbox B), and 224n (Sandbox N). Each of the sandboxes 224a, 224b, and 224n, for example, can include a set of software fault isolation rules for the execution of code on the client device 202, based on the device's hardware configuration. In implementations in which a web browser may select from multiple different application environments, each environment may offer different features or advantages relative to other environments. For example, Sandbox A may offer improved security, whereas Sandbox B may offer faster performance and/or translation time.

Each of the sandbox components 214 may be associated with a respective validator component. In the present example, Sandbox A is associated with a validator 226a (Validator A), Sandbox B is associated with a validator 226b (Validator B), and Sandbox N is associated with a validator 226n (Validator N). Each of the validators 226a, 226b, and 226n, for example, can determine whether a program may be reliably translated, and can evaluate an application binary to determine whether a sandbox's set of rules are followed. In general, validators may be part of a sandbox implementation, for sandboxes that use SFI. Validators, for example, may address reliable disassembly, data integrity (i.e., no loads or stores outside of a data sandbox), instruction safety, and control flow integrity (i.e., ensuring that control flow during execution is constrained to control-flow targets that were identified and checked for safety before execution). By ensuring that a translator produces machine code that can be reliably disassembled, for example, a validator can ensure that the security properties of a sandbox are followed, such as the restriction of return instructions and system calls, and the sandboxing of memory references and control flow address targets. Sandbox designs that do not use disassembly, for example, may use other mechanisms to intercept potentially unsafe operations.

In general, translators and sandboxes (with their respective validators) may be paired, and may be deployed together by the application environment provisioning system 110. If a translator generates code that does not follow the rules of its associated sandbox, for example, the sandbox may not execute the program, as the program code may include unsafe instructions. Thus, a translator is generally configured to transform a program for execution by one or more central processing units (CPUs) constrained by a particular sandbox. Validators and translators are generally separated, facilitating the development of each component by different parties. For example, if a hardware vendor were to ship a microprocessor with a defect that could potentially cause a sandbox to be vulnerable, the vendor could modify a translator to not generate a faulty instruction, while developers of the application environment could modify the corresponding sandbox and validator to not accept the faulty instruction. Thus, in some implementations, sandboxes (and validators) may maintain the overall security of a client device in case of a faulty translator or hardware component (for defects amenable to this technique).

The application environment selector 216 can select between multiple available application environments, based at least in part on a hardware configuration of a client device. For example, when receiving a portable program 230, the web browser 206 can use the application environment selector 216 to examine the program and to identify a translation scheme and sandbox combination suitable for the program and for the client device 202. After a suitable application environment has been selected, for example, the web browser 206 can select and use one of the translator components 212 to translate the portable program 230 to a machine-specific instruction set 232 for the client device 202, and can use a corresponding one of the sandbox components 214 (and an associated validator) to execute the translated program using software-based fault isolation.

Figure 3:
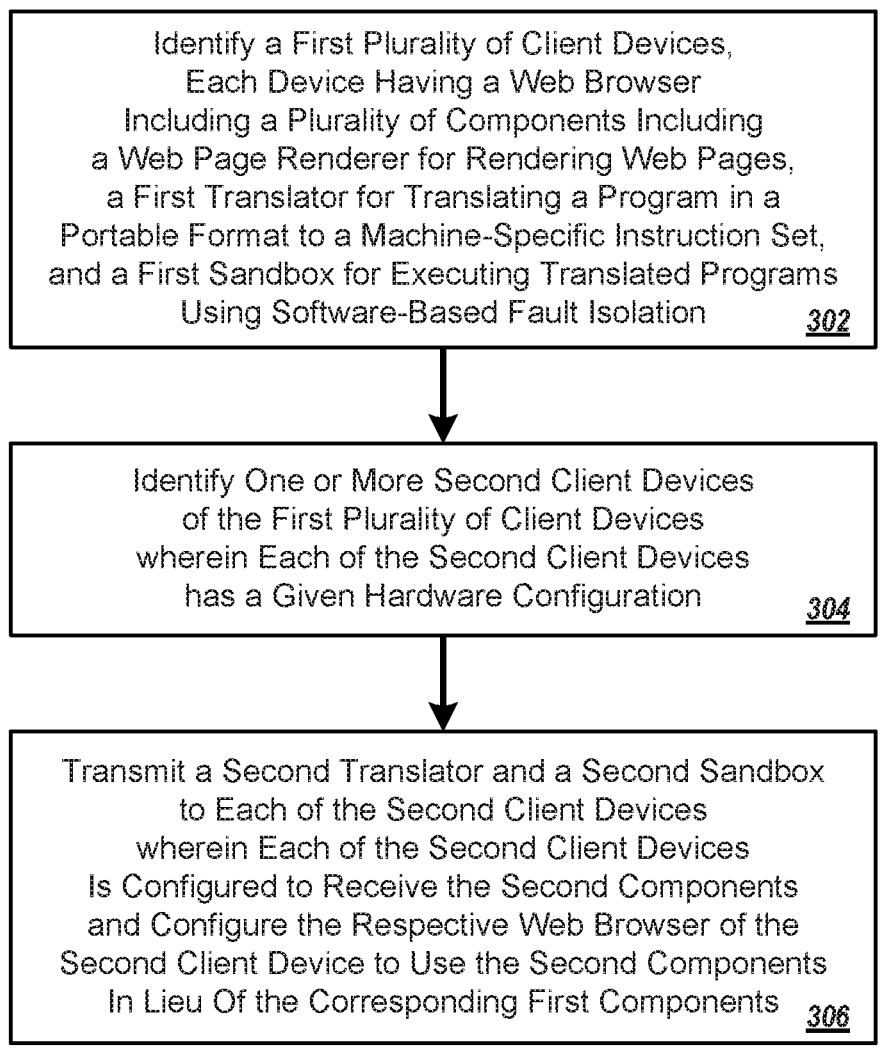
FIG. 3 is a flow diagram illustrating an example technique for providing translator and sandbox components.

FIG. 3 is a flow diagram illustrating an example technique 300 for providing translator and sandbox components. Briefly, the technique 300 includes identifying a plurality of client devices, identifying a subset of the client devices that have a given hardware configuration, and transmitting a translator component and a sandbox component to each of the subset of client devices.

In more detail, a first plurality of client devices is identified (302). With reference to FIG. 1, for example, the application environment provisioning system 110 can identify the client devices 102a, 102b, and 102n. Each of the client devices 102a, 102b, and 102n may have a respective web browser installed that is configured to receive and use components provided by the application environment provisioning system 110, for example. Each web browser can include a web page renderer component for rendering web pages, a first translator component for translating a program in a portable format to a machine-specific instruction set, and a first sandbox component for executing programs translated to the machine-specific instruction set on the first client device using software-based fault isolation. With reference to FIG. 2, for example, the web browser 206 includes the web page renderer 210, the translator 222a (Translator A) for translating the portable program 230 to the machine-specific instruction set 232, and the sandbox 224a (Sandbox A) for executing the translated program on the client device 202.

The sandbox may include a run-time library that provides interfaces to facilitate access to resources outside the sandbox by a program executing in the sandbox. In general, for a set of operating system calls, software developers may be provided with an analogous set of low-level library functions. A mechanism for providing functions, for example, may include an invocation mechanism such as an explicit caller-callee mechanism. For example, Sandbox A can handle calls as the machine-specific instruction set 232 is run by the web browser 206 (e.g., as part of a program associated with a web page). Calls handled by Sandbox A, for example, may be denied, replaced, audited, pre-processed, and/or post-processed, depending on the security rules of the sandbox. Thus, in the present example, control may be transferred from a potentially untrusted module (e.g., the machine-specific instruction set 232), out of a sandbox (e.g., Sandbox A), into a trusted runtime environment (e.g., a runtime environment associated with the web browser 206). In some implementations, each sandbox component may include a validator component for ensuring that a program in the machine-specific instruction set does not contain any unsafe instructions, does not load or store data outside of the sandbox, and has control flow integrity. Validation rules, for example, may be constructed such that reliable disassembly and program execution is assured if the rules are followed. For example, the sandbox 224a (Sandbox A) includes the validator 226a (Validator A) for ensuring that the machine-specific instruction set 232 follows its sandboxing rules, before running the program code.

One or more second client devices of the first plurality of client devices are identified (304), each of the second client devices having a given hardware configuration. Referring again to FIG. 1, for example, the application environment provisioning system 110 may have a recently updated set of translators, sandboxes, and validators, ready for distribution to hardware devices with one or more common properties, such as client devices of a particular model type (e.g., a particular smartphone model, a particular tablet version, etc.). As another example, the application environment provisioning system 110 may have application environment components ready for distribution to hardware devices which include a particular microprocessor (e.g., a particular version of a 32-bit or a 64-bit microprocessor by a particular manufacturer), or a particular architecture (e.g., ARM vs. x86). Other configuration attributes may also be considered, such as type and/or amount of memory, type and/or speed of network connection, and operating system. In the present example, the client device 102a may have a hardware configuration associated with one or more updated application environment components, and may be identified by the application environment provisioning system 110 as such through information provided by its web browser 106. The components, for example, may have been updated to correct a security flaw, or to improve performance or translation speed. As another example, the user 104a of the client device 102a may have previously expressed an interest in receiving experimental versions of application environment components which are being tested prior to general release.

A second translator component and a second sandbox component are transmitted (306) to each of the second client devices. For example, the application environment provisioning system 110 can provide a set of updated translators, sandboxes, and validators to the client device 102a. Each of the second devices can be configured to receive the second components and configure their respective web browsers to use the second components in lieu of the corresponding first components. Referring again to FIG. 2, for example, the client device 202 can receive the translator 222b (Translator B), the sandbox 224b (Sandbox B), and the validator 226b (Validator B). If the received components are intended to replace the existing components, for example, client device 202 may register Translator B, Sandbox B, and Validator B with the web browser 206, and may remove Translator A, Sandbox A, and Validator A. If the received components are intended to coexist with the existing components, for example, both component sets may be registered with the web browser 206.

In some implementations, a device's application environment may be updated by transmitting an updated validator and translator. For example, the sandbox components 214 may include a single sandbox. Upon receiving the translator 222b (Translator B) and the validator 226b (Validator B), for example, the application environment may replace the translator 222a (Translator A) with Translator B, and may replace the validator 226a (Validator A) with Validator B. The single sandbox, for example, can include runtime elements which are not part of any validator, and which may not change during an update. Moreover, the single sandbox of the present example may be configured to operate with multiple different validators.

Figure 4:
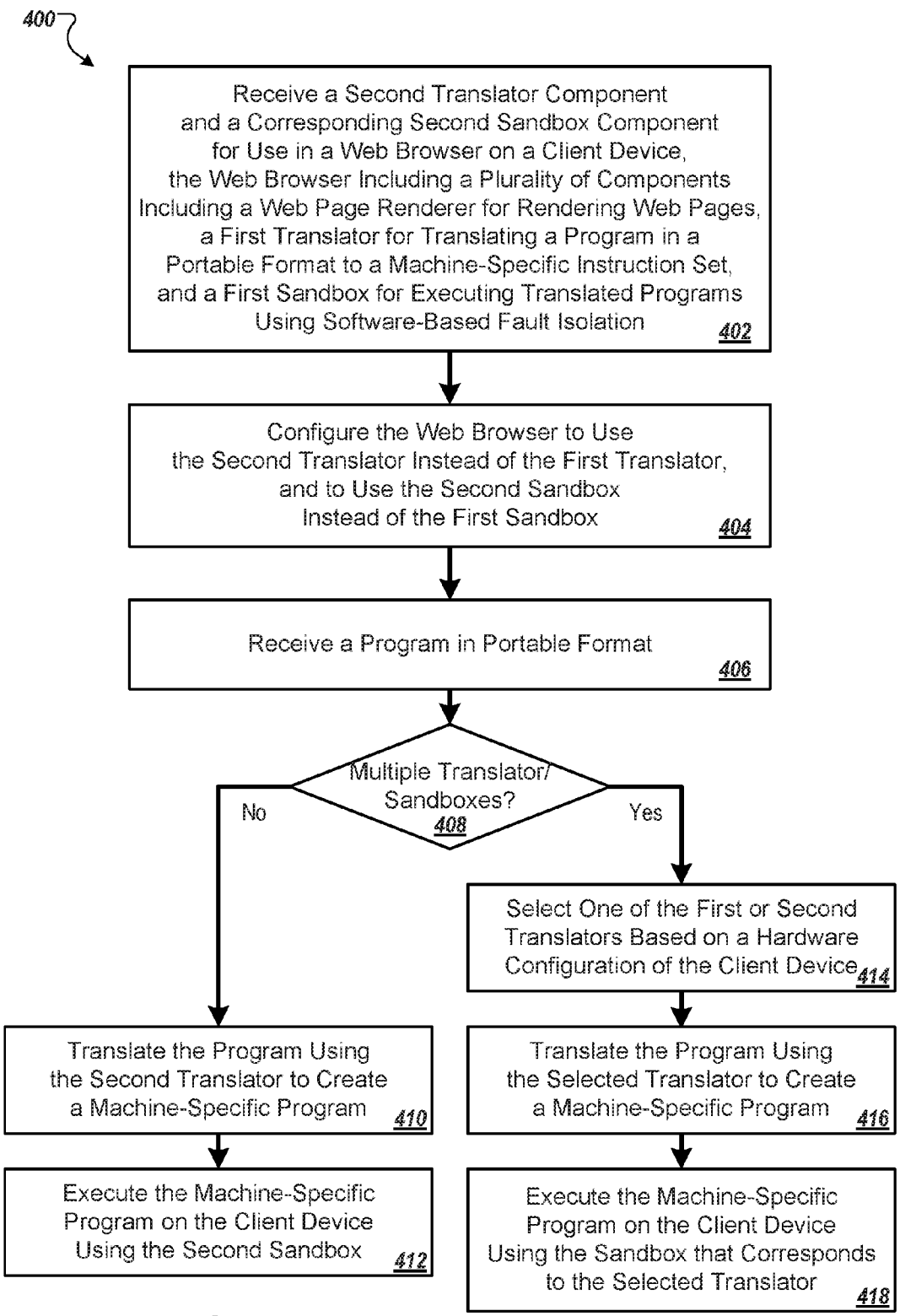
FIG. 4 is a flow diagram illustrating an example technique for receiving and selecting translator and sandbox components.

FIG. 4 is a flow diagram illustrating an example technique 400 for receiving and selecting translator and sandbox components. Briefly, the technique 400 includes receiving a translator component and a corresponding sandbox component for use in a web browser on a client device, and configuring the web browser to use the received translator component instead of a previously used translator component, and to use the received sandbox component instead of a previously used sandbox component.

In more detail, a second translator component and a corresponding second sandbox component are received (402) for use in a web browser on a client device. With reference to FIG. 2, for example, the client device 202 can receive the translator 222b (e.g., Translator B, a newly available translator) and the sandbox 224b (e.g., Sandbox B, a newly available sandbox) for use in the web browser 206. The web browser 206, for example, may include the web page renderer 210 for rendering web pages, a first translator (e.g., Translator A, a currently existing translator) for translating the portable program 230 to the machine-specific instruction set 232, and a corresponding first sandbox (e.g., Sandbox A, a currently existing sandbox) for executing programs translated to the machine-specific instruction set on the client device 202 using software-based fault isolation.

In some implementations, each sandbox component may include a validator component for ensuring that a program in the machine-specific instruction set does not contain any unsafe instructions, does not load or store data outside of the sandbox, and has control flow integrity. For example, Sandbox A includes Validator A for ensuring that the machine-specific instruction set 232 follows the sandboxing rules of Sandbox A, and Sandbox B includes Validator B for ensuring that the instruction set follows the sandboxing rules of Sandbox B.

The web browser may be configured (404) to use the second translator component instead of the first translator component, and to use the second sandbox component instead of the first sandbox component. For example, if an application environment uses a single translator/sandbox pairing, upon receiving updated versions of currently existing application environment components (e.g., translators, sandboxes, and validators), the client device 202 may configure the web browser 206 to use the updated versions (e.g., Sandbox B and Translator B) in place of the existing versions (e.g., Sandbox A and Translator A), and may remove the existing versions. As another example, if the received components are intended to coexist with the existing components, both component sets may be registered with the web browser 206.

A program is received (406) in a portable format. For example, the web browser 206 may access a web page which is associated with portable program code (e.g., bitcode associated with a media player, a game, an editor, etc.). Upon receiving the portable program 230, for example, a determination (408) is made of whether the application environment is configured to use multiple translator/sandbox pairings, or to use a single translator/sandbox pairing.

If the application environment is configured to use a single translator/sandbox pairing, for example, the program is translated (410) using the second translator component (the newly available and registered component) to create a machine-specific program. For example, if previously existing application environment components (e.g., Translator A, Sandbox A, and Validator A) have been replaced with updated versions of the components (e.g., Translator B, Sandbox B, and Validator B), the updated translator component (e.g., Translator B) may be used to translate the portable program 230 to the machine-specific instruction set 232. The machine-specific program is executed (412) on the client device using the second sandbox component (the newly available and registered component). For example, after translating and validating the portable program 230, the client device 202 can use the updated sandbox component (e.g., Sandbox B) to execute the machine-specific instruction set 232.

If the application environment is configured to use multiple translator/sandbox pairings, for example, one of the first or second translator components is selected (414). For example, if multiple sets of application environment components are configured to coexist, the application environment selector 216 can evaluate the portable program 230 and criteria such as a user's preferences, an application's requirements and/or type, a trust relationship with an application provider, and other suitable criteria when selecting from environments with different security, performance, and translation capabilities. For example, if the received portable program 230 is from an untrusted source, the application environment selector 216 may select a set of application environment components with advanced security protections. As another example, if the received portable program 230 is generally CPU-bound, such as a video editing program, the application environment selector 216 may select a set of application environment components with fast performance. As another example, if the received portable program 230 has a large code base, the application environment selector 216 may select a set of application environment components with fast translation.

The program is translated (416) using the selected translator component to create a machine-specific program. For example, based on attributes of the received portable program 230 and on the configuration of the client device 202, the application environment selector 216 may have selected Translator A as an appropriate translator component. Thus, Translator A may be used to translate the portable program 230 to the machine-specific instruction set 232. The machine-specific program is executed (418) on the client device using the sandbox component that corresponds to the selected translator component. For example, the client device 202 can use Validator A and Sandbox A to validate and execute the machine-specific instruction set 232. As the machine-specific program is executed, for example, the client device 202 and/or the web browser 206 may perform analysis and profiling operations to potentially identify a more suitable application environment, or to provide information which may be used by developers to improve an existing environment.

By including application environments on client devices for use within web browsers, for example, code can be transformed on a device and appropriate sandboxing rules may be applied immediately before the code is executed. Thus, flexibility may be gained in terms of the variety of and the customization of sandboxing rules that may be applied on a host machine.

Figure 5:
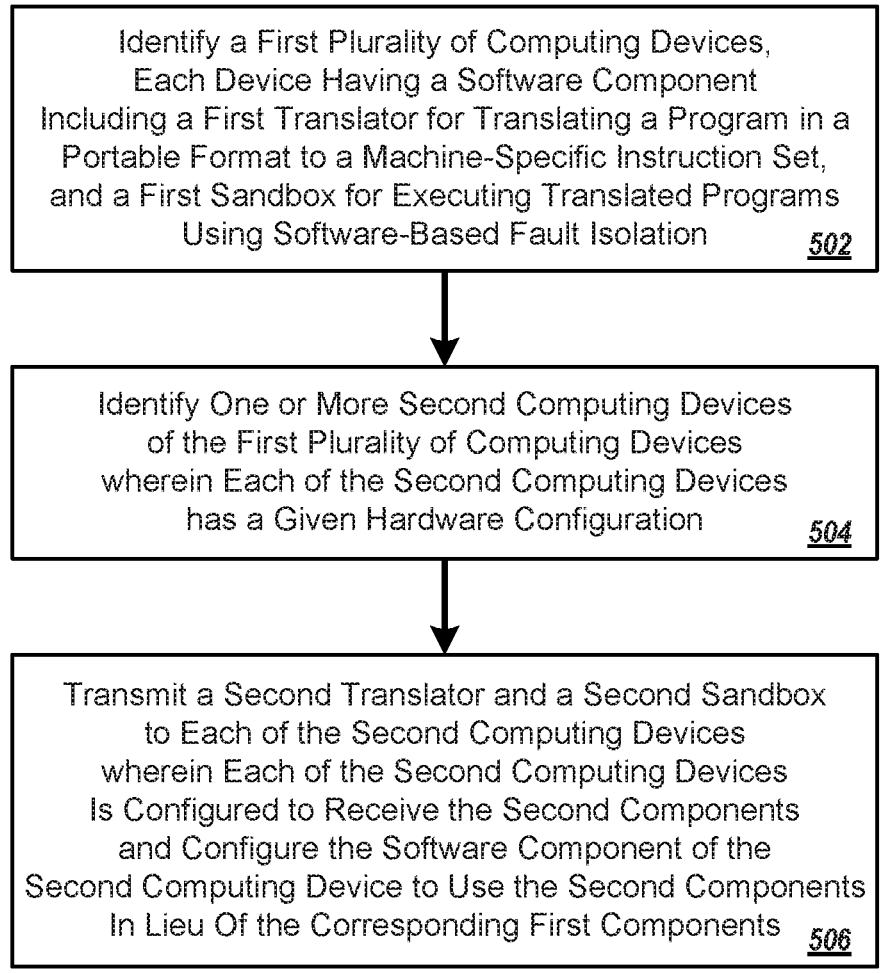
FIG. 5 is a flow diagram illustrating an example technique for providing translator and sandbox components.

FIG. 5 is a flow diagram illustrating an example technique 500 for providing translator and sandbox components. Briefly, the technique 500 includes identifying a plurality of computing devices, identifying a subset of the computing devices that have a given hardware configuration, and transmitting a translator component and a sandbox component to each of the subset of computing devices.

In more detail, a first plurality of computing devices is identified (502). With reference to FIG. 1, for example, the application environment provisioning system 110 can identify the web server(s) 112. For example, the web server(s) 112 may be configured to receive and use software components (associated with application environments) provided by the application environment provisioning system 110. Each software component can include a first translator component for translating a program in a portable format to a machine-specific instruction set, and a first sandbox component for executing programs translated to the machine-specific instruction set on the first computing device using software-based fault isolation.

The software component 116, for example, can be accessed by the web server(s) 112 by using an application programming interface. The sandbox component associated with the software component 116, for example, may include a run-time library that provides interfaces to facilitate access to resources outside the sandbox by a program executing in the sandbox. For a set of operating system calls, for example, software developers may be provided with an analogous set of low-level library functions. A mechanism for providing functions, for example, may include an invocation mechanism such as an explicit caller-callee mechanism. For example, the sandbox can handle calls as an instruction set associated with a web application is run by the software component 116. Calls handled by the sandbox, for example, may be denied, replaced, audited, pre-processed, and/or post-processed, depending on the security rules of the sandbox. Thus, for example, control may be transferred from a potentially untrusted module (e.g., a module included in the web application), out of the sandbox, into a trusted runtime environment (e.g., a runtime environment associated with the software component 116). In some implementations, each sandbox component may include a validator component for ensuring that a program in the machine-specific instruction set does not contain any unsafe instructions, does not load or store data outside of the sandbox, and has control flow integrity. Validation rules, for example, may be constructed such that reliable disassembly and program execution is assured if the rules are followed.

One or more second computing devices of the first plurality of computing devices are identified (504), each of the second computing devices having a given hardware configuration. For example, the application environment provisioning system 110 may have a recently updated set of translators, sandboxes, and validators, ready for distribution to hardware devices with one or more common properties, such as computing devices of a particular model type. As another example, the application environment provisioning system 110 may have application environment components ready for distribution to hardware devices which include a particular microprocessor or architecture. In the present example, the web server(s) 112 may have a hardware configuration associated with one or more updated application environment components, and may be identified by the application environment provisioning system 110 as such. The components, for example, may have been updated to correct a security flaw, or to improve performance or translation speed.

A second translator component and a second sandbox component are transmitted (506) to each of the second computing devices. For example, the application environment provisioning system 110 can provide a set of updated translators, sandboxes, and validators to one or more of the web server(s) 112. Each of the second devices can be configured to receive the second components and configure their respective software components (e.g., software component 116) to use the second components in lieu of the corresponding first components. If the received components (e.g., translator, sandbox, and validator) are intended to replace the existing components, for example, the web server(s) 112 may register the received components with the software component 116, and may remove the existing components. If the received components are intended to coexist with the existing components, for example, both component sets may be registered with the software component 116.

Figure 6:
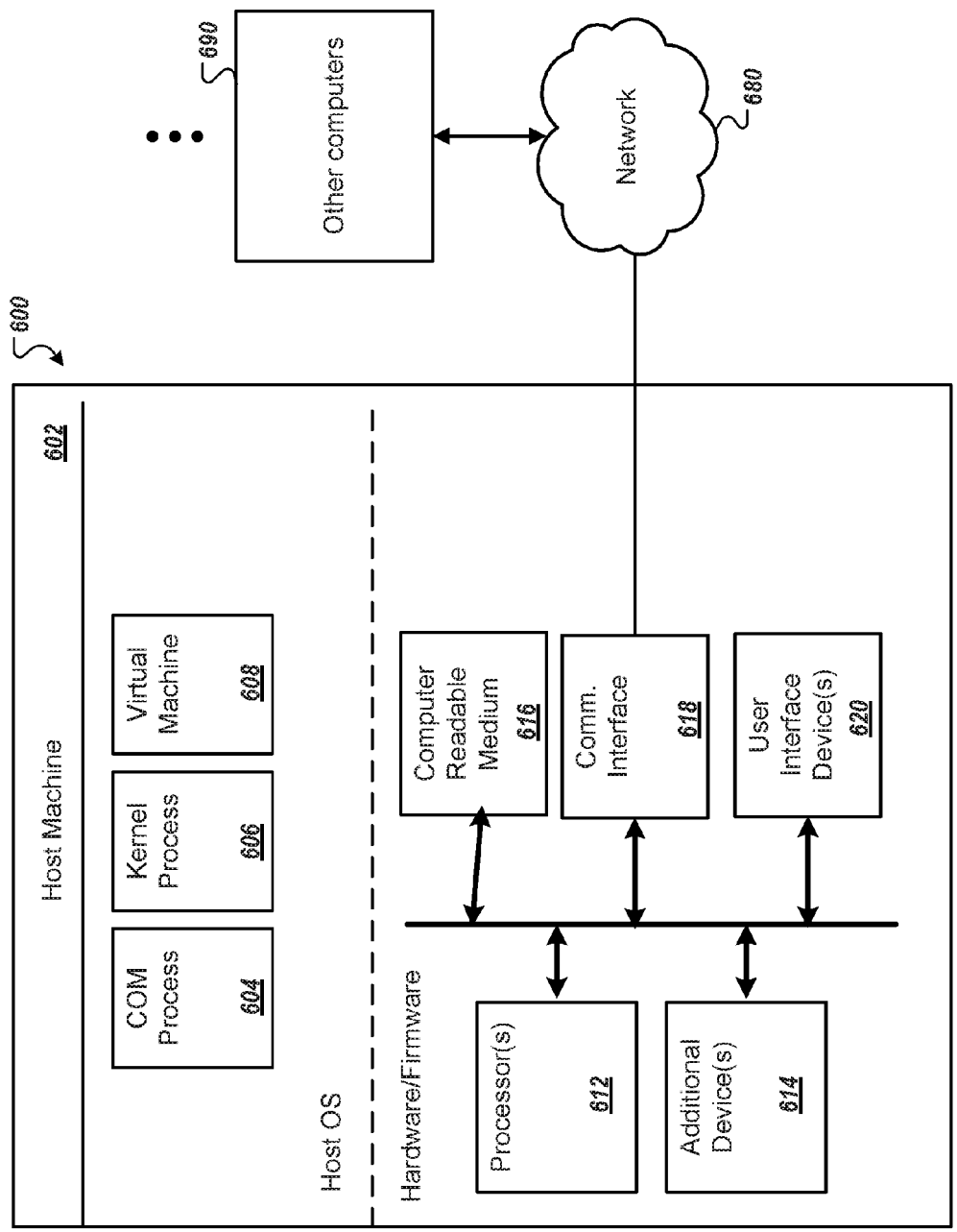
FIG. 6 is a schematic illustration of an example host machine.

FIG. 6 is a schematic illustration of an example host machine. The host machine 600 generally consists of a data processing apparatus 602. The data processing apparatus 602 can optionally communicate with one or more other computers 690 through a network 680. While only one data processing apparatus 602 is shown in FIG. 6, multiple data processing apparatus can be used in one or more locations. The data processing apparatus 602 includes various modules, e.g. executable software programs. One of the modules is the kernel 606 of a host operating system. A communication process module 604 is configured to establish VPNs, encapsulate packets and to de-encapsulate packets. A virtual machine module 608 includes virtual hardware, a guest operating system, and guest applications. Although several software modules are illustrated, there may be fewer or more software modules. Moreover, the software modules can be distributed on one or more data processing apparatus connected by one or more networks or other suitable communication mediums.

The data processing apparatus 602 also includes hardware or firmware devices including one or more processors 612, one or more additional devices 614, a computer readable medium 616, a communication interface 618, and optionally one or more user interface devices 620. Each processor 612 is capable of processing instructions for execution within the data processing apparatus 602. In some implementations, the processor 612 is a single or multi-threaded processor. Each processor 612 is capable of processing instructions stored on the computer readable medium 616 or on a storage device such as one of the additional devices 614. The data processing apparatus 602 uses its communication interface 618 to communicate with one or more computers 690, for example, over a network 680. Examples of user interface devices 620 include a display, a camera, a speaker, a microphone, a tactile feedback device, a keyboard, and a mouse. The data processing apparatus 602 can store instructions that implement operations associated with the modules described above, for example, on the computer readable medium 616 or one or more additional devices 614, for example, one or more of a floppy disk device, a hard disk device, an optical disk device, or a tape device.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A non-transitory computer-readable medium having instructions stored thereon that, when executed on a computing device having a machine-specific instruction set, cause the computing device to perform operations comprising:
   receiving, by the computing device and from a computing system that is remotely located from the computing device, first portable code, the first portable code being a portable version of a first program,
      wherein the computing device includes multiple sets of application environment components and each set of application environment components includes:
      (i) a respective translator component for translating portable code into the machine-specific instruction set of the computing device, and
      (ii) a respective sandboxing component for executing translated programs that have been translated into the machine-specific instruction set of the computing device by one of the translator components, the respective sandboxing component using software-based fault isolation;
   selecting, based on a set of selection criteria and from among the multiple sets of application environment components, a particular set of application environment components;
   translating the first portable code into the machine-specific instruction set of the computing device using the respective translator component of the particular set of application environment components to generate a machine-specific version of the first program; and
   executing the machine-specific version of the first program on the computing device using the respective sandboxing component of the particular set of application environment components.

2. The computer-readable medium of claim 1, wherein:
   the particular set of application environment components further includes a validator component that corresponds to the respective sandboxing component of the particular set of application environment components; and the operations comprise:
   verifying, using the validator component, that the machine-specific version of the first program complies with a set of rules associated with the respective sandboxing component of the particular set of application environment components.

3. The computer-readable medium of claim 1, wherein the first portable code comprises bitcode having a neutral, non-machine specific format.

4. The computer-readable medium of claim 1, wherein:
   the multiple sets of application environment components are configured to provide different levels of program execution security; and
   selecting the particular set of application environment components comprises determining that the level of program execution security provided by the particular set of application environment components satisfies a target level of program execution security.

5. The computer-readable medium of claim 1, wherein:
   the multiple sets of application environment components are configured to provide different program execution speeds; and
   selecting the particular set of application environment components comprises determining that the program execution speed provided by the particular set of application environment components satisfies a target program execution speed.

6. The computer-readable medium of claim 1, wherein:
   the multiple sets of application environment components are configured to provide different program translation speeds; and
   selecting the particular set of application environment components comprises determining that the program translation speed provided by the particular set of application environment components satisfies a target program translation speed.

7. The computer-readable medium of claim 1, wherein the operations comprise:
   evaluating the first program to determine execution requirements associated with the first program; and
   selecting the particular set of application environment components comprises determining that the particular set of application environment components are appropriate for the determined execution requirements associated with the first program.

8. The computer-readable medium of claim 1, wherein:
   the set of selection criteria indicates a user preference for executing programs on the computing device; and
   selecting the particular set of application environment components comprises determining that the particular set of application environment components are appropriate for the user preference for executing programs on the computing device.

9. The computer-readable medium of claim 1, wherein:
selecting the particular set of application environment components comprises determining that the particular set of application environment components are appropriate for a level of trust associated with a provider of the first program.

10. The computer-readable medium of claim 1, wherein:
receiving the first portable code comprises receiving the first portable code by a web browser;
the web browser includes the multiple sets of application environment components; and the operations comprise:
receiving a new set of application environment components that is not included among one or more initial sets of application environment components that have been registered with the web browser; and
registering the new set of application environment components with the web browser.

11. The computer-readable medium of claim 1, wherein:
the receiving, selecting, translating, and executing are performed by a web browser on the computing device; and
the web browser includes the multiple sets of application environment components.

12. A computing device, comprising:
one or more processors;
a storage device storing code for a program that is to be executed on the computing device;
a plurality of sandboxing components that are each configured to execute the program on the computing device using respective software-based fault isolation techniques that are different from each other; and
an application environment selector configured to select, from among the plurality of sandboxing components and based on a set of selection criteria, a first sandboxing component with which to execute the program.

13. The computing device of claim 12, further comprising:
a web browser that includes the plurality of sandboxing components and the application environment selector.

14. The computing device of claim 12, further comprising a rendering component configured to render a web page for presentation to a user of the computing device, wherein the program is configured to be executed in conjunction with rendering the web page.

15. The computing device of claim 12, wherein:
the code for the program that is to be executed on the computing device is portable code;
the computing device further comprises a plurality of translator components that are each configured to use different techniques to translate the portable code into a machine-specific instruction set of the computing device; and
the application environment selector is further configured to select, based on the set of selection criteria, a first translator component with which to translate the program.

16. The computing device of claim 12, further comprising a plurality of validator components that are each configured to verify, before the program is executed on the computing device, that the program complies with a set of rules associated with the sandboxing component that is selected to execute the program,
wherein the application environment selector is further configured to select, based on the set of selection criteria, a first validator component with which to verify the program.

17. The computing device of claim 12, wherein the set of selection criteria comprises at least one of a type of the program, execution requirements associated with the program, a target level of program execution security, or a target program execution speed.

18. A computer-implemented method, comprising:
receiving, on a computing device and from a computing system that is remotely located from the computing device, first portable code, the first portable code being a portable version of a first program,
wherein the computing device includes multiple sets of application environment components and each set of application environment components includes:
(i) a respective translator component for translating portable code into the machine-specific instruction set of the computing device, and
(ii) a respective sandboxing component for executing translated programs that have been translated into the machine-specific instruction set of the computing device by one of the translator components, the respective sandboxing component using software-based fault isolation;
selecting, based on a set of selection criteria and from among the multiple sets of application environment components, a particular set of application environment components;
translating the first portable code into the machine-specific instruction set of the computing device using the respective translator component of the particular set of application environment components to generate a machine-specific version of the first program; and
executing the machine-specific version of the first program on the computing device using the respective sandboxing component of the particular set of application environment components.

19. The computer-implemented method of claim 18, wherein:
the particular set of application environment components further includes a validator component that corresponds to the respective sandboxing component of the particular set of application environment components; and the operations comprise:
verifying, using the validator component, that the machine-specific version of the first program complies with a set of rules associated with the respective sandboxing component of the particular set of application environment components.

* * * * *